(12) United States Patent
Riordan et al.

(10) Patent No.: US 8,667,494 B1
(45) Date of Patent: Mar. 4, 2014

(54) CONTROLLING RESOURCE ALLOCATION USING THRESHOLDS AND SCHEDULING

(75) Inventors: Patrick Brian Riordan, Watertown, MA (US); David Joshua Brown, Chelmsford, MA (US); Kenneth A. Halligan, Leominster, MA (US); Arieh Don, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 1717 days.

(21) Appl. No.: 11/510,028

(22) Filed: Aug. 25, 2006

(51) Int. Cl.
*G06F 9/46* (2006.01)

(52) U.S. Cl.
USPC .......................................................... 718/104

(58) Field of Classification Search
None
See application file for complete search history.

(56) References Cited

U.S. PATENT DOCUMENTS

| | | | |
|---|---|---|---|
| 4,583,182 A * | 4/1986 | Breddan | ........................ 700/291 |
| 5,206,939 A | 4/1993 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 6,122,289 A * | 9/2000 | Brown et al. | ................. 370/465 |
| 7,206,890 B2 * | 4/2007 | Mathiske | .......................... 711/6 |
| 7,653,906 B2 * | 1/2010 | Chen et al. | ..................... 718/101 |
| 7,877,754 B2 * | 1/2011 | Birkestrand et al. | .......... 718/104 |
| 2006/0020691 A1 * | 1/2006 | Patterson et al. | .............. 709/223 |
| 2007/0058650 A1 * | 3/2007 | Ricketts | ........................ 370/412 |

OTHER PUBLICATIONS

U.S. Appl. No. 10/879,383, filed Dec. 29, 2009, Halligan.
U.S. Appl. No. 10/880,279, filed Oct. 7, 2008, Scharland.

* cited by examiner

*Primary Examiner* — Meng An
*Assistant Examiner* — Eric C Wai
(74) *Attorney, Agent, or Firm* — Muirhead and Saturnelli, LLC

(57) ABSTRACT

Described are techniques for allocating resources. Two consumer processes using two resources are provided. A first threshold of a first of the resources for a first of said two consumer processes is provided. A second threshold of a second of said resources for said first consumer process is provided. Consumption information is received regarding actual consumption of the two resources by the first consumer process. Execution of the first consumer process is scheduled in accordance with the first and the second thresholds and the consumption information.

17 Claims, 10 Drawing Sheets

CONTROLLING RESOURCE ALLOCATION USING THRESHOLDS AND SCHEDULING

BACKGROUND

1. Technical Field

This application generally relates to resource allocation, and more particularly to techniques used in connection with resource allocation.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

A resource may be used by one or more consumers of the data storage system. When there are multiple consumers, one problem is how to allocate the resource for use among the consumers. The problem of how to allocate data storage system resources may become more complex if there are multiple resources of the data storage system to be allocated, if the allocation of a first resource of the data storage system may affect the usage of a second of the resources, and/or if a factor external to the data storage system may affect resource consumption by a consumer.

SUMMARY OF THE INVENTION

In accordance with one aspect of the invention is a method for allocating resources comprising: providing two consumer processes using two resources; providing a first threshold of a first of said resources for a first of said two consumer processes; providing a second threshold of a second of said resources for said first consumer process; receiving consumption information regarding actual consumption of said two resources by said first consumer process; and scheduling execution of said first consumer process in accordance with said first and said second thresholds and said consumption information. The method may include: determining whether actual consumption of any of said two resources by said first consumer process exceeds or is within a predetermined amount of a corresponding one of said thresholds; and adjusting scheduled execution time of said first consumer in accordance with said determining. The resources may be included in a data storage system and the resources may be allocated for use by said two consumer processes executing in said data storage system, a second of said two consumer processes processing I/O operations received at said data storage system from a host, and said first of said two consumer processes is a migration process that migrates data between said data storage system and another data storage system. The method may also include: prior to allocating additional portions of said resources for use by said migration process, determining if said allocating causes any one of said thresholds to be exceeded, and if any one of said thresholds is exceeded, suspending execution of said migration process until said additional portions are available for use by said migration process. The two consumer processes may utilize said two resources associated with a first adapter and are executed using a processor of said first adapter. The first resource may be port bandwidth of a port of said first adapter and said second resource may be an amount of I/O buffers of said first adapter, said port being used for communications between said data storage system and said other data storage system, and for communications between said data storage system and said host. The other data storage system may process data migrated by said migration process at a first rate slower than a second rate at which said data storage system transmits said data. The second threshold may be adjusted in accordance with an amount of said second resource utilized by said second consumer process. The second threshold may be a fixed amount. The step of scheduling may include adjusting an amount of time between scheduled execution times of said first consumer process to maintain consumption of said two resources below said thresholds. An amount of said port bandwidth allocated for use by said migration process in accordance with said first threshold may affect an amount of said I/O buffers consumed by said migration process. The migration process may push data from said data storage system to said other data storage system. The migration process may pull data from said other data storage system to said data storage system.

In accordance with another aspect of the invention is a data storage system comprising: at least one data storage device; one or more adapters, each of said adapters including code for: migrating data between said at least one data storage device of said data storage system and another data storage system; receiving a first threshold and a second threshold, said first threshold indicating a maximum amount of port bandwidth of said each adapter for use in connection with said migrating, said second threshold indicating a maximum amount of I/O buffers of said each adapter for use in connection with said migrating; scheduling said migrating in accordance with said first and said second thresholds; and processing I/O operations received from a host at said data storage system. Each of the one or more adapters may include code for adjusting said second threshold in accordance with an amount of said I/O buffers utilized by said each adapter in connection with processing said I/O operations. The data storage system may include a plurality of adapters. Each of the adapters may include code for migrating data by pushing data from said data storage system to said other data storage system. Each of the adapters may include code for migrating data by pulling data from said other data storage system to said data storage system.

In accordance with another aspect of the invention is a computer readable medium comprising code for allocating resources, the computer-readable medium comprising code for: providing two consumer processes using two resources; providing a first threshold of a first of said resources for a first of said two consumer processes; providing a second threshold of a second of said resources for said first consumer process; receiving consumption information regarding actual consumption of said two resources by said first consumer process; and scheduling execution of said first consumer process in accordance with said first and second thresholds and said consumption information. The resource may be included in a data storage system, said resources may be allocated for use by said two consumer processes executed by a processor of a first adapter in said data storage system, a second of said two consumer processes processing I/O operations received at said data storage system from a host, said first of said two consumer processes is a migration process that migrates data between said data storage system and another data storage system, said first resource is port bandwidth of a port of said first adapter and said second resource is an amount of I/O buffers of said first adapter, said port being used for communications between said data storage system and another data storage system, and for communications between said data storage system and said host.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
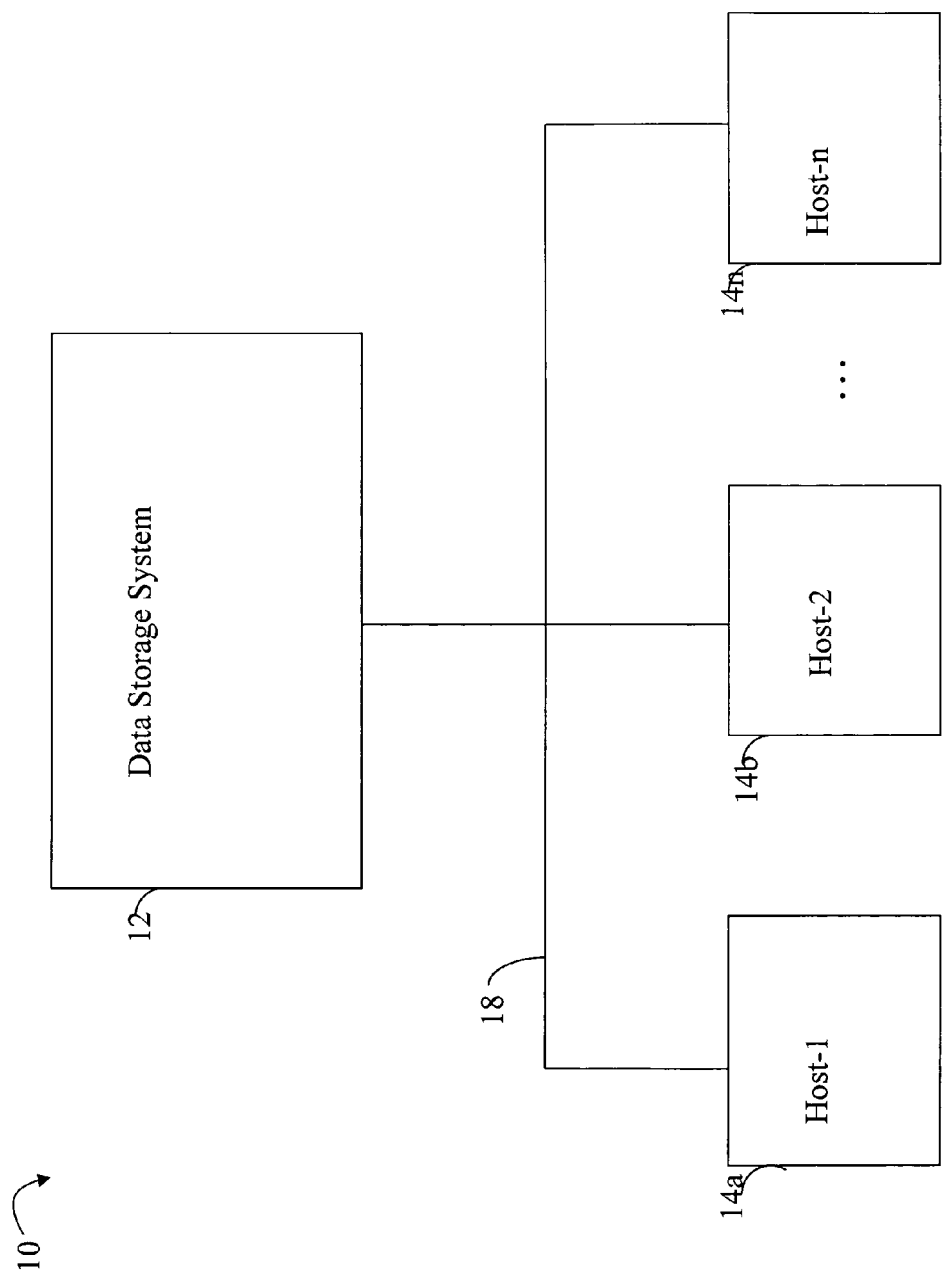
FIG. 1 is an example of an embodiment of a computer system that may utilize the techniques described herein.

Referring now to FIG. 1, shown is an example of an embodiment of a computer system that may be used in performing the techniques described herein. The computer system 10 includes a data storage system 12 connected to host systems 14a-14n through communication medium 18. In this embodiment of the computer system 10 and the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the computer system 10.

Each of the host systems 14a-14n and the data storage system 12 included in the computer system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the computer system 10 may use a variety of different communication protocols such as SCSI, Fibre Channel, or iSCSI, and the like. Some or all of the connections by which the hosts and data storage system 12 may be connected to the communication medium 18 may pass through other communication devices, such as a Connectrix or other switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
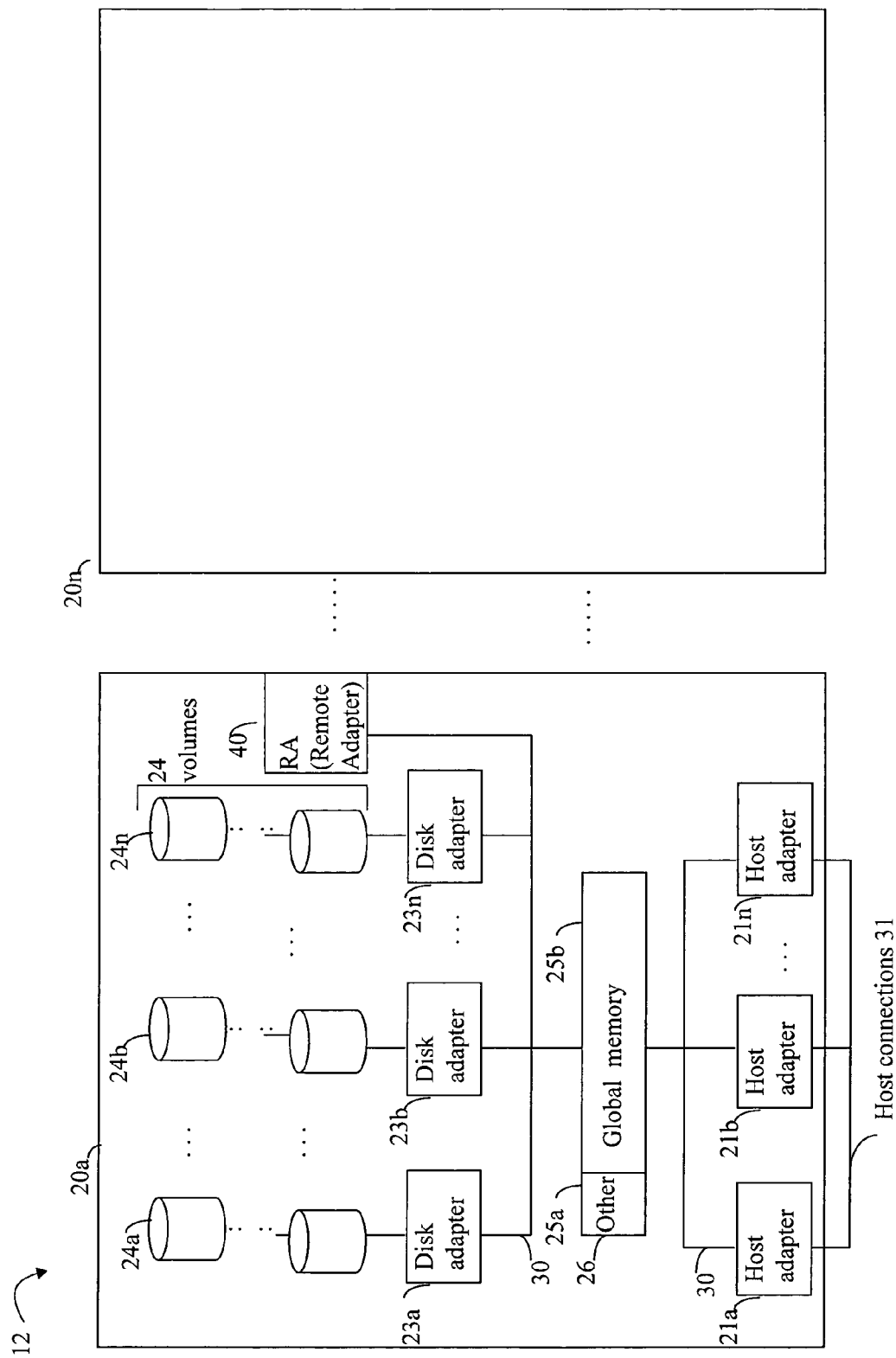
FIG. 2A is an example of an embodiment of a data storage system.

Referring now to FIG. 2A, shown is an example of an embodiment of the data storage system 12 that may be included in the computer system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the computer system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a.

The system 20a may also include one or more host adapters ("HAs") or directors 21a-21n. Each of these HAs may be used to manage communications and data operations between one or more host systems and the global memory. In an embodiment, the HA may be a Fibre Channel Adapter or other adapter which facilitates host communication.

One or more internal logical communication paths may exist between the DA's, the RA's, the HA's, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon.

The DA performs I/O operations on a disk drive. In the following description, data residing on an LV may be accessed by the DA following a data request in connection with I/O operations that other directors originate.

Figure 2B:
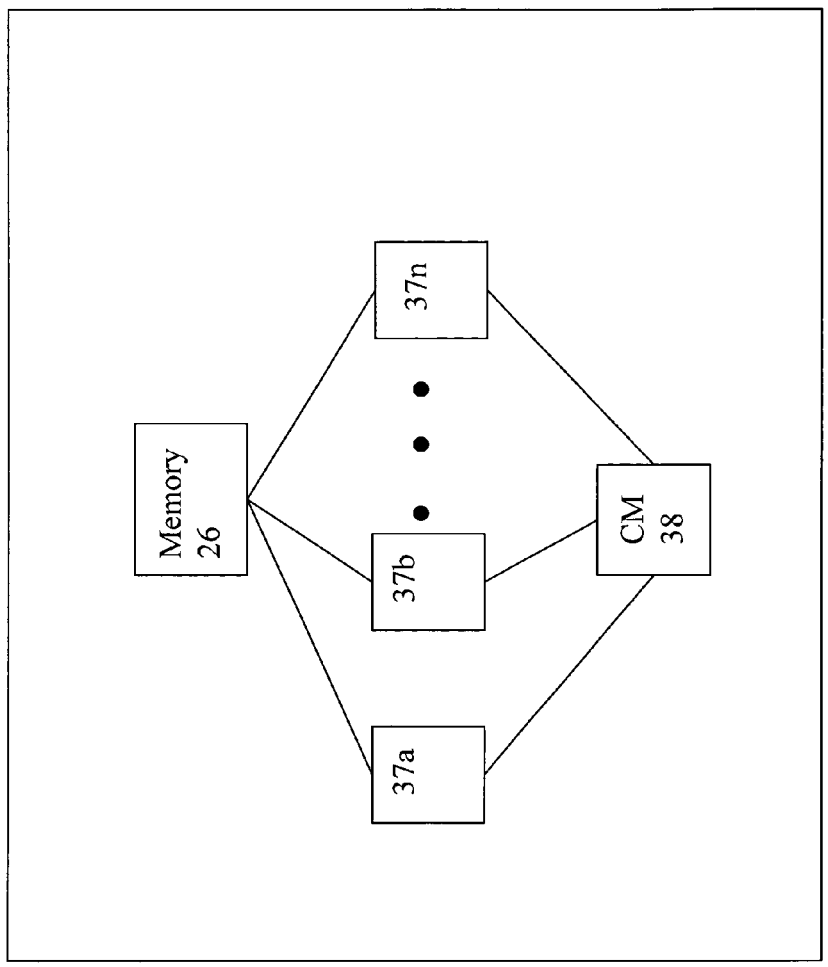
FIG. 2B is a representation of the logical internal communications between the directors and memory included in one embodiment of the data storage system of FIG. 2A.

Referring now to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. In an embodiment disclosed herein, there may be up to sixteen directors coupled to the memory 26. Other embodiments may use a higher or lower maximum number of directors that may vary.

The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

Figure 3:
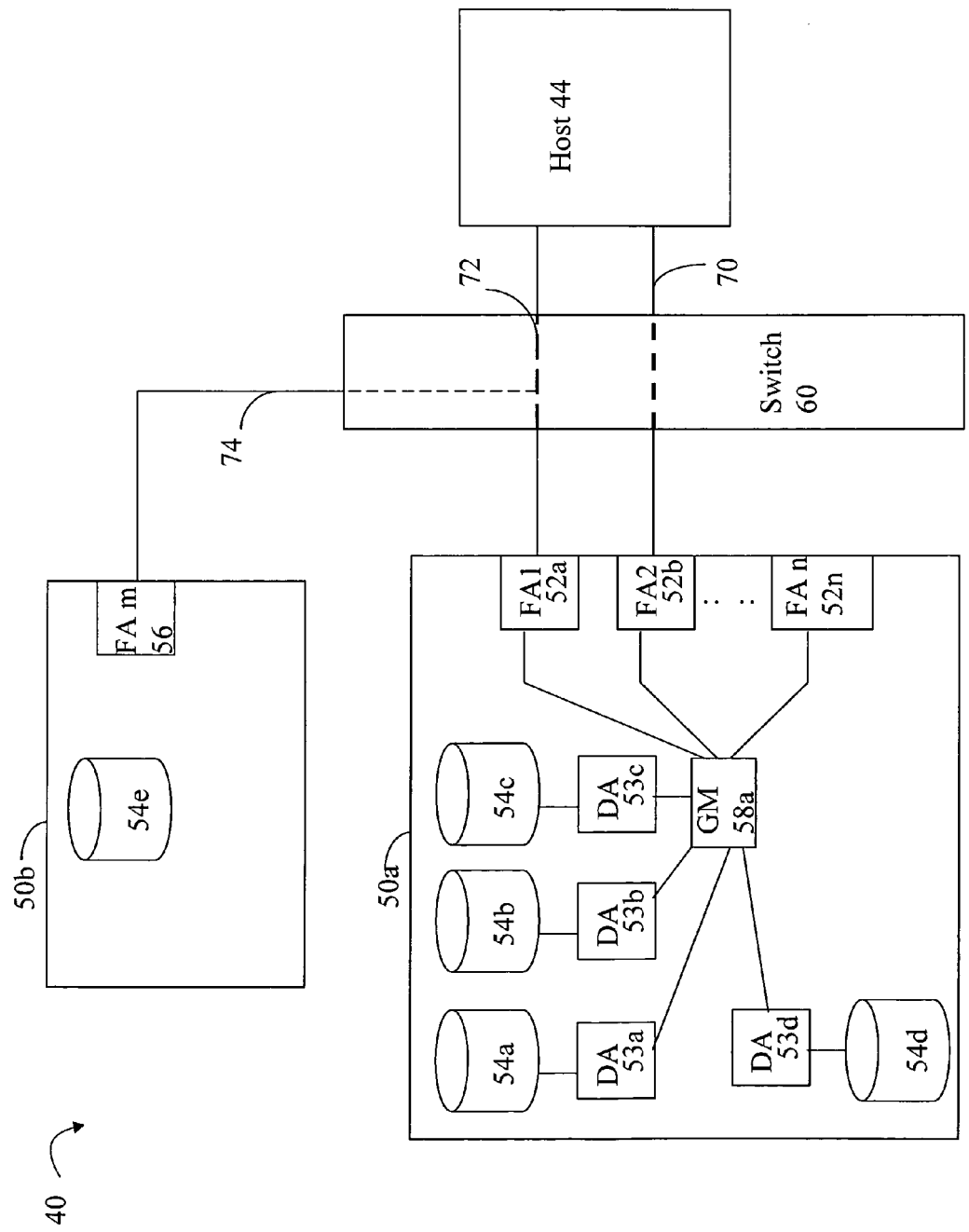
FIG. 3 is a more detailed example of an embodiment of a computer system that may utilize the techniques described herein with a data push migration session.

Referring now to FIG. 3, shown is an example of an embodiment of a computer system 40 that may be used in connection with the techniques described herein. It should be noted that the embodiment illustrated in FIG. 3 presents a simplified view of some of the components of a computer system as generally illustrated in FIGS. 1 and 2A, for example, including only some detail of the data storage systems 50a and 50b for the sake of illustration.

Included in the system 40 are the data storage systems 50a and 50b, a switch 60 and host 44. The data storage system 50a and the host 44 may communicate using switch 60. In this example, the data storage system 50a includes data storage devices 54a-54d, DAs 53a-53d, global memory (GM) 58a, and multiple Fibre Channel Adapters (FAs) 52a-52n. Each of the FAs 52a-52n has a Fibre Channel connection to the switch 60 to facilitate communications with the host 44. For example, the host 44 may issue a command in the form of one or more messages to data storage system 50a through switch 60 over path 70 or 72 to one of the FAs 52a-52n. Similarly, the switch 60 may be used to communicate messages from the data storage system 50a to the host. In one embodiment, the switch 60 may be an 8 port switch although a switch used in connection with the techniques herein may include any number of ports.

In the example 40, the host may communicate with the data storage system 50a over one or more paths such as 70 and 72. Embodiments in which data operations can be communicated from one or more hosts to the data storage system over more than one path may be characterized as a multipath environment with respect to host-data storage system communications. In other words, multipathing allows for two or more data paths to the data storage system to be simultaneously used for read and/or write operations.

The switch 60 may also be used in connection with communications between the data storage system 50a and the data storage system 50b. It should be noted that additional details regarding data storage system 50b have been omitted for sake of simplicity and illustration but also includes DAs, GM, and the like, as included in the data storage system 50a.

In one embodiment as illustrated herein, the FA1 52a may be used in connection with migrating or copying data from data storage system 50a to 50b over connection 74. The example 40 illustrates the FA1 52 used in connection with both receiving and processing I/O operations from the host 44, and also in connection with copying or migrating data from 50a to 50b. Any one of a variety of different techniques may be used in connection with migrating data from a device of 50a, such as device 54a, to a device of 50b, such as device 54e. An example of techniques that may be used in connection with online data migration are described in U.S. patent application Ser. No. 10/879,383, filed on Jun. 29, 2004, ONLINE DATA MIGRATION, which is incorporated herein by reference. The techniques described in U.S. patent application Ser. No. 10/879,383 provide for migration of data from a source, such as device 54a, to a target, such as device 54e, in which the source device 54a is online and available for use by the host while a point in time copy or replication of the device 54a is being made to the target device 54e. In connection with performing the copying or migrating of the data, the FA1 52a may execute code of a migration process to perform the copying or migration of data from 54a to 54e. The FA1 52a may execute other code in connection with processing received I/O operations from the host 44. The FA1 52a may also execute other code in connection with the migration processing utilizing techniques described herein. This is described in more detail in following paragraphs.

The FA1 52a may perform processing which allocates resources of the FA1 52a and the data storage system 50a for use in connection with the migration processing and with processing the received I/O commands from the host 44. In one embodiment, two resources that may be used with both the migration processing and processing received host I/O commands are I/O buffers and port bandwidth of FA1 52a. It should be noted that the port bandwidth represents the available bandwidth for a single port of the FA. An embodiment may provide a technique by which a customer of the data storage system may allocate a first percentage of the available port bandwidth of the FA1 52a for migration processing and/or a second percentage for processing received host commands, such as the received host I/O commands. For example, the FA's port may have a bandwidth capability of 100 megabytes/second. 50% of this amount, or 50 megabytes/second, may be allocated for use with the migration processing with the remaining bandwidth allocated for use in connection with received host I/O operations. The FA1 52a may execute a scheduler process to schedule the migration process so that migration processing does not utilize more than the allocated port bandwidth. The scheduler may, for example, monitor the resources actually used by the migration processing over a period of time. The scheduler may increase or decrease the amount of time between scheduled migration process execution times in accordance with the actual port bandwidth usage and the allocated port bandwidth for migration processing.

It is possible for the customer to allocate an amount of the port bandwidth for used with migration processing which creates an imbalance with respect to the target bandwidth associated with the data storage system 50b processing the data that is copied or migrated to 50b. In other words, the initiator of the migration processing, the data storage system 50a, may have more bandwidth generally available or allocated for use than the target data storage system 50b of the migration process. As a result, the system 50b is not able to process the migrated data at a rate in proportion to the rate at which the system 50a sends the data causing a bottleneck at the system 50a. The foregoing disproportion may be temporary, for example, due to processing performed by the data storage system 50b at a point in time. The disproportion may also be characterized as being more permanent and not caused by particular conditions of the system 50b at a point in time. For example, the amount of FA1 port bandwidth of 50a allocated for migration processing may be 50 megabytes/second. The target system 50b may not process, or otherwise may not be capable of processing, migrated data at more than 30 megabits/second. When migrating data from 50a to 50b, I/O buffer resources are also allocated on 50a to hold the data which is being migrated. These I/O buffers remain allocated until after the data has been successfully copied to the system 50b. As a result, an amount of the I/O buffer resources of the system 50a may remain allocated for use by the migration process for an undesirable amount of time while waiting for the target system 50b to process the migrated data (e.g., result in increased target system response time). The amount of I/O buffer resources allocated for use by the migration process may adversely affect host I/O processing. For example, the data storage system 50a may be unable to process received host I/O operations because of an insufficient amount of I/O buffer resources due to the amount of I/O buffers consumed by the migration processing.

As a solution in connection with techniques described herein, an embodiment may limit the amount of available I/O buffers allocated for use with migration processing. In one embodiment, the limit or threshold of I/O buffers which may be allocated at any point in time for use by the migration processing may be a fixed or predetermined threshold value, such as ½ of the available I/O buffers. The threshold and allocation of I/O buffers may be made with respect to the resources of each director, such as each FA1 52a, executing code for migration processing. It should be noted that an embodiment may utilize a different threshold of I/O buffers for use by the migration processing other than ½ of the available I/O buffers. In such an embodiment, a policy may be utilized in which processing host I/O operations has a higher priority than performing the migration processing in order to decrease or minimize host response time for the host I/O operations.

An embodiment may use other threshold values besides ½ of the available I/O buffers as described above. For example, a user may specify a threshold for the available I/O buffers for use in connection with migration processing of zero (0) effectively pausing migration processing. At a later point in time, the user may change the threshold to a non-zero value causing migration processing to resume or start.

As an alternative to having a fixed or predetermined I/O buffer threshold for the migration process, an embodiment may also utilize a dynamically determined or adjustable I/O buffer threshold. The threshold may be tunable in accordance with the amount of I/O buffers needed for use in connection with processing received host I/O operations.

The foregoing may be characterized as having two consumer processes (e.g., the migration process and processing of host I/O operations) on an FA. The two consumers utilize two common or shared resources (e.g., FA port bandwidth and I/O buffers) of the FA on the system 50a. With respect to the migration process, the FA may be characterized as the controller or initiator of the migration process. In the foregoing example, the migration process executes in the source data storage system and pushes or migrates data to a target. At the same time, the FA may also be characterized as a target with respect to the host I/O operations in which the FA does not control or regulate the rate at which I/O operations are received. When factors associated with the target of the migration process (e.g., target bandwidth and/or target response time for processing migration copying) indicate a slower target performance or processing rate than the performance of the migration source or initiator, a disproportionate imbalance between the source and target systems of the migration process may exist. The I/O buffer threshold for migration processing may be used in connection with allocation of FA resources or resources of the data system $50a$ in order to avoid overallocating I/O buffers for migration processing. Such overallocation may result in adversely affecting (e.g., increasing) host response time in connection with processing I/O commands received from the host. Using the techniques described herein, the migration processing may be performed and scheduled in accordance with resource thresholds and the host I/O operations which may be received at a varying rate. The data storage system $50a$ cannot control the rate at which the host generates I/O operations but the system $50a$, as initiator or controller of the migration process, can control the migration process and associated processing, such as resource allocation and scheduling for the migration processing.

With reference to FIG. 3, it should be noted that the foregoing describes a data push model with respect to the migration process. Data is pushed from the source or initiator of the migration processing to the target. It may also be the case that data is migrated in the reverse direction. The initiator of the migration processing, system $50a$, may alternatively function as the target of the migration process so that data is pulled by the system $50a$ to the system $50a$ from the system $50b$. With the data pull model, the system including the FA controlling the migration process functions as the target by pulling or copying data from another source system, such as $50b$. The migration process performing a data pull is also described in more detail in U.S. patent application Ser. No. 10/879,383. In connection with a data pull model, the techniques described herein for use with a data push model may also be used. Similar problems may exist in connection with a data pull technique as with the data push technique with regard to over allocating resources for use with migration processing if there is an imbalance or disproportion in performance due to one or more factors between $50a$ and $50b$ as described above (e.g., $50a$ has a higher performance rate than $50b$). With the data pull model, I/O buffers may be allocated in the data storage system $50a$ prior to requesting data from the data storage system $50b$. As such, the I/O buffers are allocated while waiting for the system $50b$ to provide the requested data to $50a$.

Figure 4:
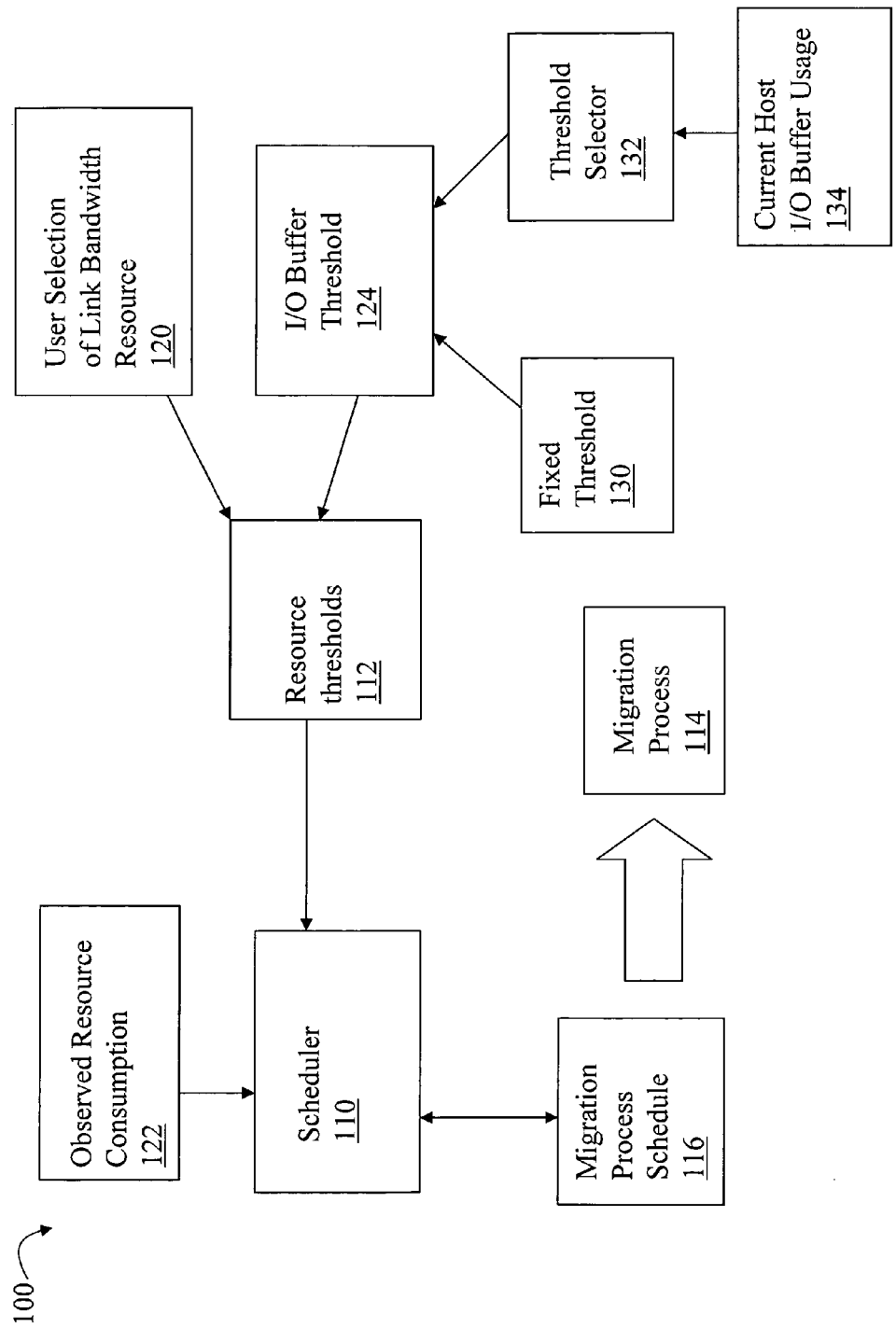
FIG. 4 is an example of processes that may be executed by a director of the system of FIG. 3 performing migration processing.

Referring now to FIG. 4, shown is an example of processes that may be executed by an FA, such as FA1 $52a$, in connection with the techniques described herein. In the example 100 of FIG. 4, an FA, such as FA1 $52a$, may execute code for a scheduler process 110, a migration process 114, and a threshold selector process 132. The scheduler 110 may perform processing to adjust the frequency at which the migration process 114 is scheduled for execution. As known in the art, the scheduler 110 may, for example, adjust the amount of time between scheduled execution times of the migration process 114. The amount of time or delay time may affect when the migration process is next placed in the "ready for execution" state. The amount of delay may be adjusted in accordance with the amount of actual resources consumed by the migration process 114 and the resource thresholds 112 for the migration process 114.

The scheduler 110 may observe actual resource consumption of one or more resources over a period of time. In one embodiment, the scheduler 110 may examine the amount of resources of the FA1 $52a$ consumed, for example, in the last 4 seconds to observe the amount of port bandwidth and the amount of I/O buffers utilized by the migration process 114. An embodiment may observe the resources consumed for different time intervals other than 4 seconds as set forth in the foregoing for purposes of illustration. The scheduler 110 may also receive as another input the resource thresholds 112 indicating the threshold allocations for use in connection with the migration process. Based on the resource thresholds 112, the scheduler 110 may adjust the delay time for scheduling the next execution of the migration process 114. For example, if the migration process appears to be approaching its allocated amount of port bandwidth or allocated amount of I/O buffer, the scheduler 110 may increase the delay time or amount of time between scheduled migration process executions. This will be described in more detail in following paragraphs. As such, the scheduler 110 affects the migration process schedule 116 indicating when the migration process 114 is next scheduled for execution by the FA1 $52a$.

In one embodiment, the resource thresholds 112 may include a first threshold 120 for the port bandwidth and a second threshold 124 for the I/O buffer. As described herein, the threshold 120 may be user selected as a percentage value. As known in the art, the threshold 120 may be selected and specified using this and other techniques. The threshold 120 may also be specified using a value other than a percentage. For example, the threshold 120 may be specified using a quantity. The I/O buffer threshold 124 may be expressed in a variety of different ways such as a numeric value representing a quantity or size of I/O buffers. As described herein, the I/O buffer threshold 124 may be a fixed or predetermined threshold 130 or a dynamically adjusted threshold. An embodiment providing a dynamically adjusted threshold may utilize a threshold selector 132 which produces as an output a current value for the I/O buffer threshold 124. As will be described in more detail in following paragraphs, the threshold selector 132 may perform processing to update the threshold 124 at various times in accordance with the amount of I/O buffers needed for processing host I/Os. The threshold 124 may be adjusted in accordance with the amount needed for processing host I/Os as represented by the current host I/O buffer usage 134.

It should be noted that an embodiment may utilize the fixed threshold 130 and/or the threshold selector 132. An embodiment may provide support for both fixed and dynamically adjusted values of threshold 124. The particular technique used in determining 124 may be specified with a setting or option acting as a switch for selecting which technique to use.

It should be noted that although the threshold selector 132 is illustrated as adjusting the I/O buffer usage threshold, the threshold selector 132 may also be used in connection with adjusting one or more other thresholds used in connection with migration processing. Examples are described elsewhere herein in more detail.

Figure 5:
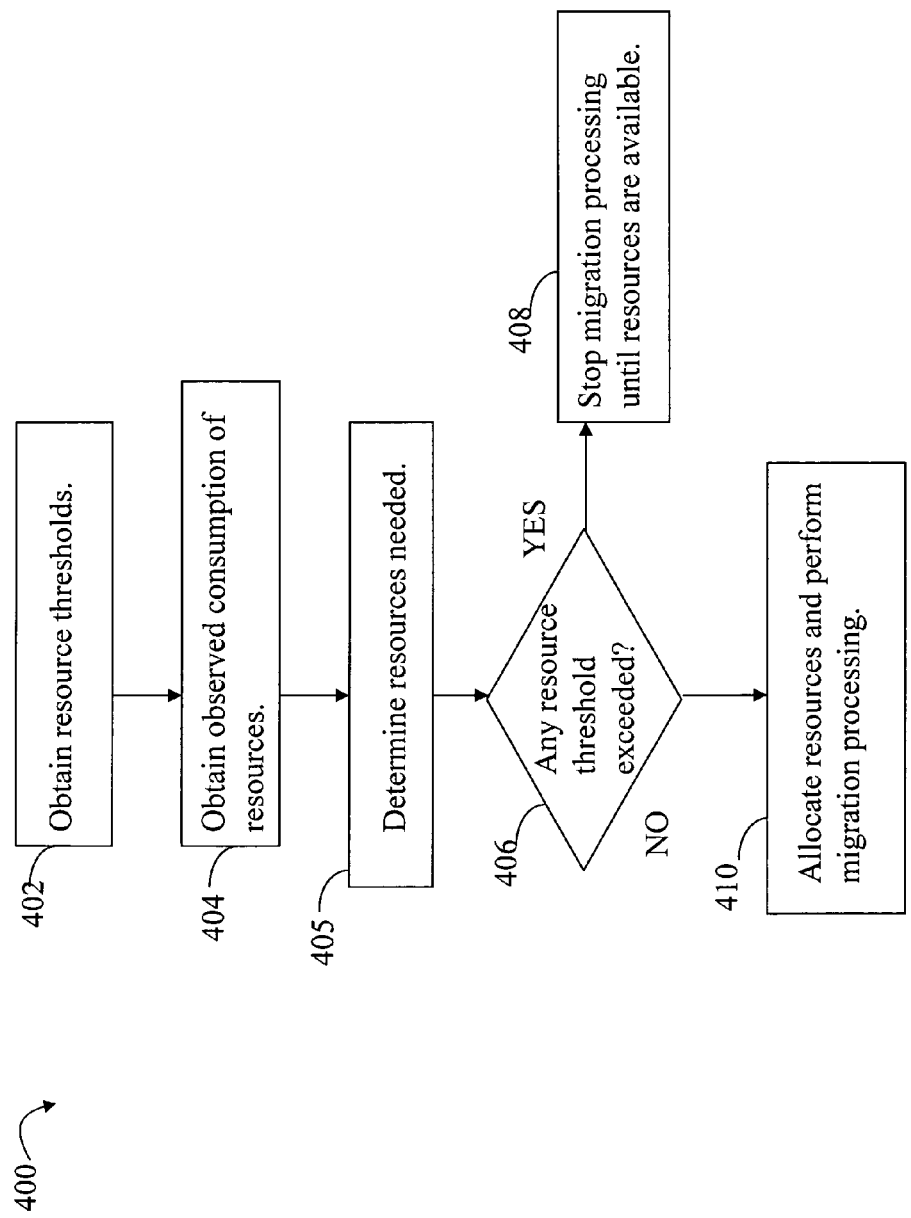
FIG. 5 is a flowchart of processing steps that may be performed prior to allocating resources in connection with migration processing.

Referring now to FIG. 5, shown is a flowchart of processing steps that may be performed in an embodiment in connection with execution of the migration process. The steps of flowchart 400 may be performed, for example, by the FA1 $52a$ prior to allocating resources for use by the migration process. For example, the processing of flowchart 400 may be performed by the migration process each time a new portion of data is copied or migrated depending on when the migration process allocates and frees resources. The steps of 400 may also be performed by code associated with allocating resources for the migration processing. At step 402, the resource thresholds are obtained. The thresholds may be those represented by element 112 of FIG. 4. At step 404, the current amount of resources consumed or allocated for the migration process is obtained. At step 405, a determination is made as to how much of the available bandwidth and the available I/O buffer resources are needed in connection with a current allocation to migrate a portion of data. In other words, step 405 determines the amount of each of the foregoing 2 resources which are used in connection with a next allocation. At step 406, a determination is made as to whether any one or more resource thresholds would be exceeded if the current allocation of the resources is made. If step 406 evaluates to no, control proceeds to step 410 to allocate the resources and continue with migration processing. If step 406 evaluates to yes, control proceeds to step 408 where migration processing is stopped until the necessary resources are available. An embodiment may perform step 408 using any one of a variety of different techniques known in the art. For example, one embodiment may suspend migration processing and resume execution of the migration process when the resources become available. This may be performed, for example, by placing the migration process in a "not ready for execution" state. Once the resources are available, the migration process may be awakened and placed in the "ready for execution" state.

Figure 6:
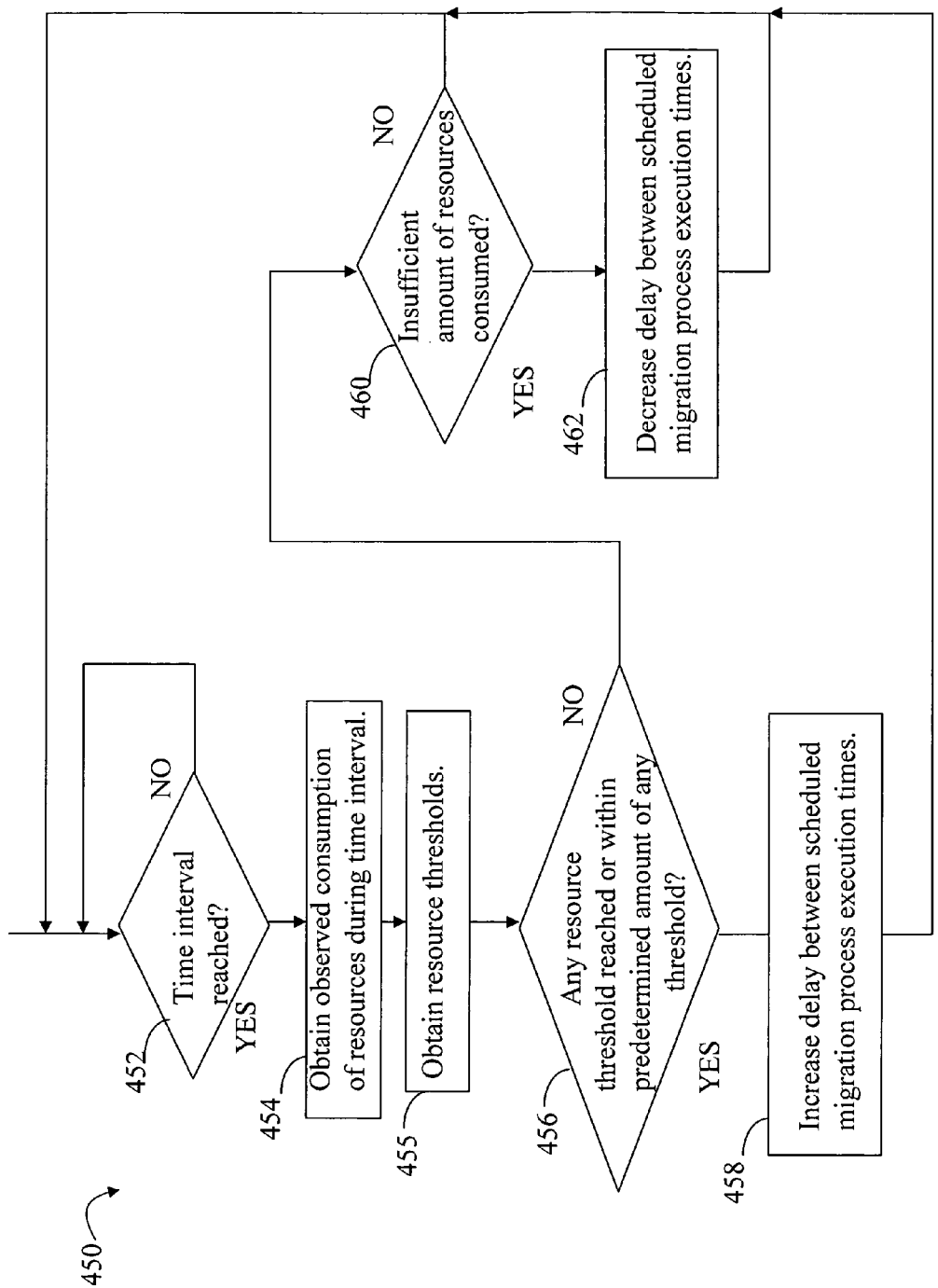
FIG. 6 is a flowchart of processing steps that may be performed in connection with scheduling a migration process for execution.

Referring now to FIG. 6, shown is a flowchart 450 of processing steps that may be performed by a scheduler in an embodiment. The steps of flowchart 450 may be performed, for example, by each scheduler process 110 for each FA performing migration processing. The scheduler may perform the processing steps of the flowchart 450 at defined time intervals. At step 452, a determination is made as to whether another time interval has elapsed. If not, control returns to step 452 until step 452 evaluates to yes. Once step 452 evaluates to yes indicating that a time interval has elapsed, control proceeds to step 454. At step 454, the amount of actual or observed resources consumed by the migration process during a time interval, such as within the past 4 seconds, is obtained. Step 454 in one embodiment includes obtaining the amount of FA port bandwidth and I/O buffer consumption by the migration process executing on the FA for which scheduling is being performed. At step 455, the resource thresholds for the migration process, such as those represented by element 112 of FIG. 4, are obtained. At step 456, a determination is made as to whether the observed consumption of any one resource is approaching, has reached, or otherwise exceeded the corresponding threshold. In one embodiment, a predetermined limit or window may be defined for each resource such that if the observed consumption of the resource falls within the range of: corresponding resource threshold-window, then step 456 evaluates to yes. It should be noted that in the embodiment described herein, there are two resources—FA port bandwidth and amount of I/O buffers—for which consumption is measured and compared. If observed consumption for any single resources meets or exceeds the corresponding threshold, or otherwise falls within the foregoing range for that resource, then step 456 evaluates to yes. If step 456 evaluates to yes, control proceeds to step 458 where the delay between migration process execution times is increased because the migration process is consuming too many resources. By increasing the delay between migration process execution times, the amount of resources consumed by the migration process is expected to decrease. In connection with step 458 processing, the delay time may represent the time interval between successively scheduled execution times for the migration process. At each such scheduled execution time, the migration process may be placed in the "ready for execution" state. An embodiment may increase the delay time using any one of a variety of techniques and increments. For example, in one embodiment, step 458 may increase the delay time by a fixed amount. From step 458, control proceeds to step 452 to wait for the next elapsed time interval.

If step 456 evaluates to no, control proceeds to step 460 where a determination is made a to whether an insufficient amount of resources is currently being consumed. In one embodiment, a minimal amount or minimum threshold may be specified for each resource being observed. If the currently observed consumption for any one resources is less than the minimal amount for that resource, then step 460 may evaluate to yes. If step 460 evaluates to yes, control proceeds to step 462 to decrease the delay between scheduled migration process execution times. By decreasing the delay between migration process execution times, the amount of resources consumed by the migration process is expected to increase. An embodiment may decrease the delay time using any one of a variety of techniques and decrement values. For example, in one embodiment, step 462 may decrease the delay time by a fixed amount. From step 462, control proceeds to step 452. If step 460 evaluates to no, control proceeds to step 452 without making any adjustment to the delay time between scheduled migration execution times.

The processing steps of 450 may be performed by each scheduler instance executing on an FA performing migration processing. The resource thresholds utilized may be determined using the various techniques also described herein.

Figure 7:
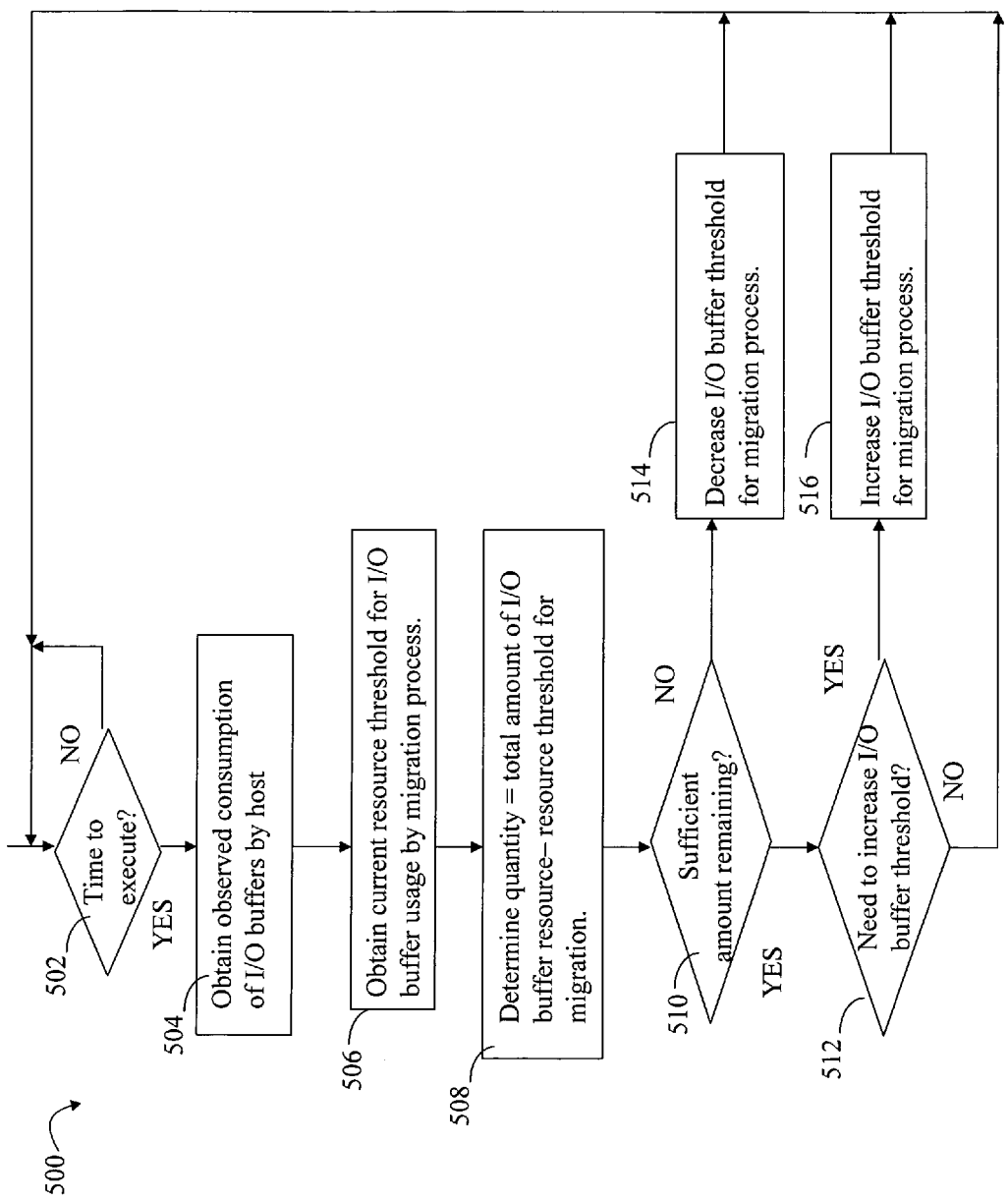
FIG. 7 is a flowchart of processing steps that may be performed in connection with selecting an I/O buffer threshold for migration processing.

Referring now to FIG. 7, shown is a flowchart of processing steps that may be performed in an embodiment by a threshold selector. As described elsewhere herein, the threshold selector may be included in an embodiment which adjusts the I/O buffer threshold for the migration process. An instance of a threshold selector may execute, for example, as a background process by each FA performing migration processing. The threshold selection processing of 500 may be performed upon the occurrence of predetermined time intervals.

At step 502, a determination is made as to whether another time interval has elapsed. If not, control continues to return to step 502 until step 502 evaluates to yes indicating that a time interval has elapsed. Control proceeds to step 504 to obtain the current consumption or allocation of host I/O buffer usage. At step 506, the current resource threshold for I/O buffer usage for the migration process is obtained. At step 508, the total amount of the I/O buffer resource—resource threshold for migration is determined. The total amount of the I/O buffer resource may represent the total amount of all I/O buffers available in the FA for allocation between the migration process and for processing received host I/Os. The quantity determined at step 508 represents the amount of I/O buffers available for processing the host I/Os if the migration process should consume I/O buffers in accordance with the currently specified migration process I/O buffer threshold. In other words, the quantity determined at step 508 represents the portion of all I/O buffers of the FA which may be allocated for use in connection with host I/O processing. A determination is made at step 510 as to whether the quantity determined at step 508 is sufficient for host I/O processing. Step 510 may compare the quantity from step 508 to the amount of I/O buffers currently consumed or allocated for use with host I/Os (e.g., as obtained in step 504). If the foregoing two values do not have a minimal separation, then step 510 may evaluate to no. As an example, the current consumption of I/O buffers for host I/O operations as obtained in step 504 is currently 60 units. The current resource threshold for I/O buffer usage by the migration process may be 20 units as obtained in step 506. The total amount of I/O buffers available for processing host I/Os as used in step 508 may be 100 units. Step 508 determines:

quantity=100 units−20 units=80 units so that if the migration process were to consume all its allocated amount of I/O buffers, 80 units of I/O buffers are still available for use in connection with host I/Os. Step 510 compares the 80 units from step 508 to the amount of I/O buffers currently consumed or allocated for host I/O processing (e.g., the 60 units from step 504). In one embodiment, the minimal separation may be any integer value≥0, such as 10 units. In this example, using the minimal separation of 10 units, the actual difference between the amount of I/O buffers available for host I/O processing (e.g., 80) and the I/O buffers currently allocated for host I/O processing (e.g., 60) is 20 units and step 510 evaluates to yes.

If step 510 evaluates to yes, control proceeds to step 512 where a determination is made as to whether to increase the I/O buffer threshold. In one embodiment, a minimum value for the I/O buffer threshold may be specified. Step 512 may determine to increase the current I/O buffer threshold if the current I/O buffer threshold is below this minimum value. If step 512 evaluates to yes, control proceeds to step 516 where the I/O buffer threshold is set to the minimum value. Control then proceeds to step 502. If step 512 evaluates to no, control proceeds directly to step 502.

If step 510 evaluates to no, control proceeds to step 514 to decrease the I/O buffer threshold for the migration process. The amount by which the threshold at step 514 is decremented may be in accordance with the minimal separation used at step 510. In one embodiment, the I/O buffer threshold may be decremented to ensure at least the minimal separation between the current I/O buffer usage for host I/Os and the quantity determined at step 508. Other embodiments may decrease the I/O buffer threshold for migration processing by a fixed amount each time step 514 is executed. From step 514, control proceeds to step 502.

In connection with the foregoing of FIG. 7, an embodiment may perform additional processing to adjust other threshold values that may be associated with other common or shared resources, such as the FA port bandwidth. For example, an embodiment may also perform processing to adjust a threshold associated with the FA port bandwidth for use in connection with migration processing. An embodiment may perform processing at step 504 to obtain observed consumption of the FA port bandwidth, and obtain the current threshold for FA port bandwidth for migration processing. Processing of steps 508 and 510 may also include steps for making a determination as to whether a sufficient amount of the FA port bandwidth is available for use with received host I/Os. Step 514 may decrease the FA port bandwidth threshold for migration processing if step 510 evaluates to no with respect to the FA port bandwidth. Step 516 may increase the FA port bandwidth threshold for migration processing if step 512 evaluates to yes with respect to the FA port bandwidth. It should be noted that in one embodiment, a decision to adjust a resource threshold in connection with migration processing may be made independently of determinations with respect to other common or shared resources. For example, step 510 may determine that there is an insufficient amount of FA port bandwidth (e.g, step 510 evaluates to no) and step 514 may be performed with respect to the FA port bandwidth threshold. Step 510 may determine that there is a sufficient amount of the I/O buffer resource so that step 510 evaluates to yes and step 512 evaluates to no with respect to the I/O buffer threshold. Alternatively, an embodiment may perform step 510 so that if either one of the resources is determined to be insufficient, step 510 evaluates to no and step 514 may be performed for both resource thresholds. In an embodiment in which the FA port bandwidth is also adjusted by the threshold selector 132 of FIG. 4, the resource thresholds 112 may be the output of the threshold selector 132. The user selection of the FA port bandwidth 120 may specify the initial or starting value for the FA port bandwidth which may subsequently be adjusted by the threshold selector 132.

In connection with the foregoing techniques, a port of an FA of a data storage system may be a dedicated port used for migration processing. In other words, no host I/Os are received and processed at that port. In such an embodiment, all the common or shared resources (e.g., the FA port bandwidth and the I/O buffers) which may otherwise be partitioned for use in connection with migration processing and processing host I/O operations may be allocated for use with migration processing. In such embodiments, the threshold for the I/O buffer usage may be accordingly maximized with the I/O buffers of the FA.

The foregoing sets forth a description in which there is a single FA performing the migration process using a data push or a data pull technique. An embodiment may also have more than one FA executing code to perform migration processing. For example, an embodiment using a data push model may have multiple FAs in the source data storage system each executing processes illustrated in FIG. 4. In such an embodiment, there are multiple migration sessions, one on each FA pushing data from the source data storage system to the target data storage system.

Figure 8:
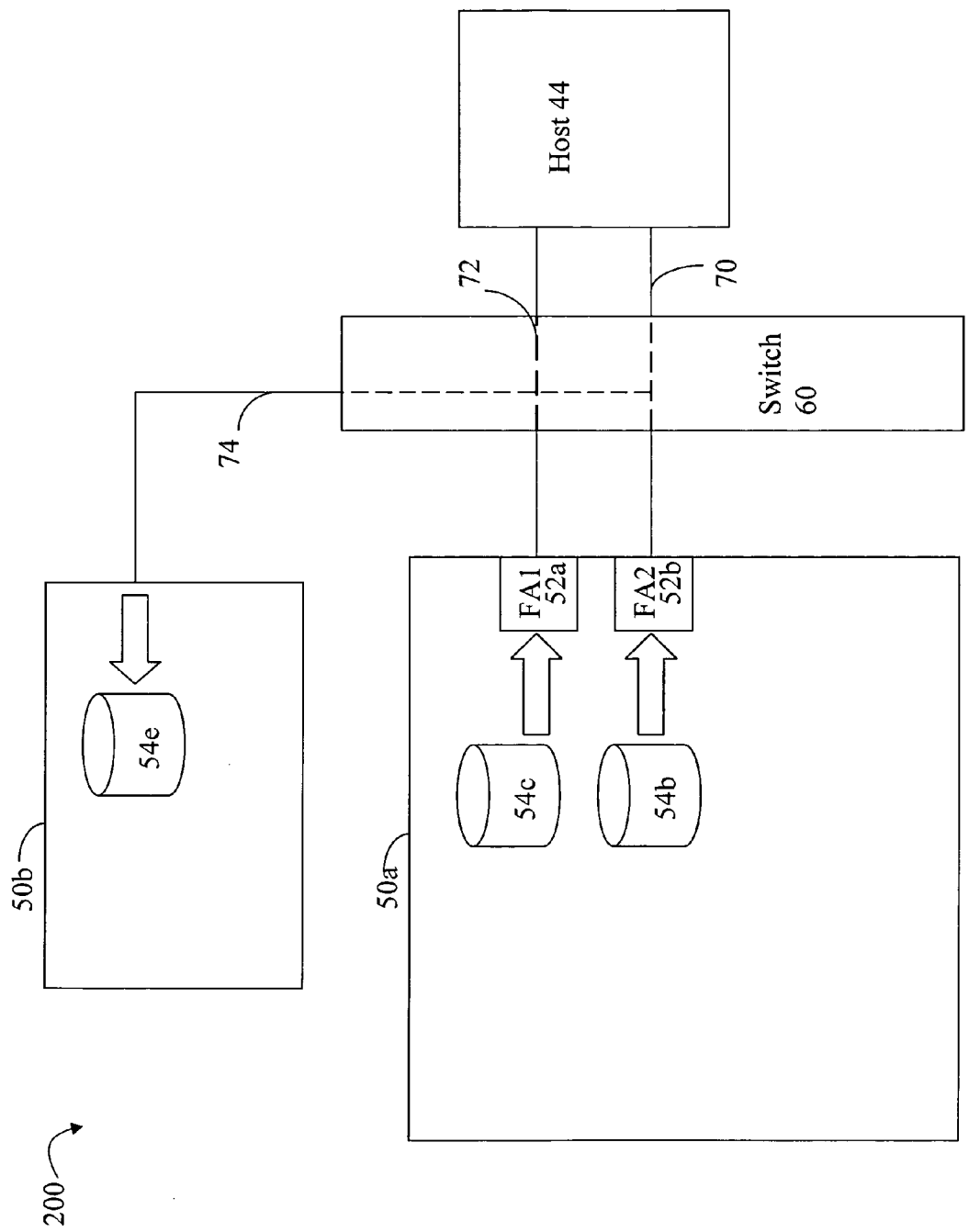
FIG. 8 is an example of an embodiment that may utilize the techniques described herein with multiple directors each performing migration processing that pushes data from a source to a target.

Referring now to FIG. 8, shown is an example of an embodiment illustrating a data push migration technique with multiple migration sessions. In the example 200, the source data storage system is 50a and the destination or target data storage system is 50b. Components of FIG. 8 which are similar to those as described elsewhere herein in connection with other figures have similar element numbers. In the example 200, the FAs 52a and 52b of the data storage system 50a each have a migration session. Each of the migration sessions and other processing on the FAs may operate independently of processing performed on other FAs utilizing the techniques described herein such as, for example, scheduling, adjusting and determining an I/O buffer threshold value for migration processing, and the like. A first migration session may be associated with FA1 52a in which a first instance of a migration process is executing. FA1 52a copies or migrates data from device 54c to a portion of device 54e. A second migration session may be associated with FA2 52b in which a second different instance of a migration process is executing. FA2 52b copies or migrates data from device 54b to another portion of device 54e. FA1 52a and FA2 52b each may execute processes as illustrated in FIG. 4 in which the migration process uses a data push technique to migrate data as illustrated in FIG. 8.

Use of a distributed technique in which multiple FAs of a source data storage system migrate data to a target using a data push model as illustrated in FIG. 8 is described, for example, in U.S. patent application Ser. No. 10/880,279, filed on Jun. 29, 2004, DISTRIBUTED WORKFLOW TECHNIQUES, which is incorporated herein by reference.

Figure 9:
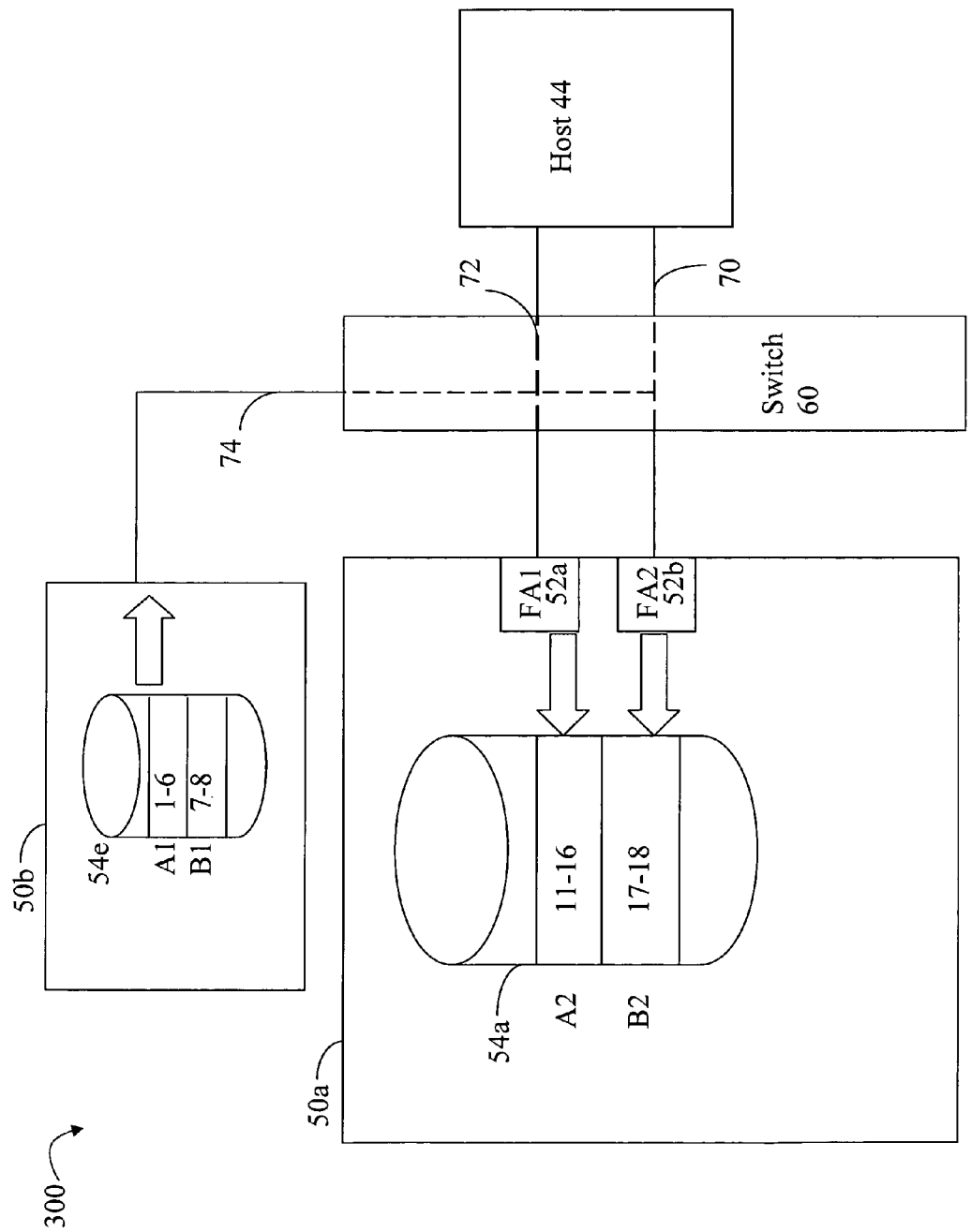
FIG. 9 is an example of an embodiment that may utilize the techniques herein with multiple directors each performing migration processing that pulls data from a source to a target.

The techniques described herein may also be used in connection with a data pull model with multiple migration sessions. An example of such a data pull model is illustrated in FIG. 9 and is also described, for example, in U.S. patent application Ser. No. 10/880,279.

Referring now to FIG. 9, shown is an example of an embodiment illustrating a data pull migration technique with multiple migration sessions. In the example 300, the source data storage system is 50b and the destination or target data storage system is 50a. Components of FIG. 9 which are similar to those as described elsewhere herein in connection with other figures have similar element numbers. In the example 300, the FAs 52a and 52b of the data storage system 50a each have a migration session. Each of the migration sessions and other processing performed by the FAs may be done independently of other migration sessions and processing performed by other FAs using the techniques described herein such as, for example, scheduling, adjusting and determining an I/O buffer threshold value for use in connection with migration, and the like. The migration process executing on each of the FAs of 50a is pulling data from a common source of 50b. In this example, a first migration pull session of FA1 52a is pulling or copying data from portion A1 of device 54e to portion A2 of device 54a. A second migration pull session of FA2 52b is pulling or copying data from portion B1 of device 54e to portion B2 of device 54a. FA1 52a and FA2 52b each may execute processes as illustrated in FIG. 4 in which the migration process uses a data pull technique to migrate data as illustrated in FIG. 9.

In an embodiment in which there are multiple FAs each performing migration processing in accordance with a data push or data pull technique, the FAs may be characterized collectively as being in a same group servicing a same or common target. The common target may be defined at the device level. If one FA in the group performs processing or otherwise makes adjustments due to the consumption of resources by migration processing, similar steps may be taken by all other FAs performing migration processing with respect to the same target (e.g., in the same group). In one embodiment in which a group of FAs service a common target, when one FA in the group makes adjustments, for example, in connection with adjusting the delay between scheduled migration process execution times (e.g., steps 458 and/or 462 of FIG. 6), that FA may notify other FAs in the same group to perform similar processing. In connection with FIG. 6, steps 458 and 462 may also include additional processing to notify other FAs in the same group to increase or decrease delay time between scheduled migration process execution times. In an embodiment in which a group of FAs service a common target, if an FA adjusts the I/O buffer threshold, and/or any other threshold of a common or shared resource, such as the FA port bandwidth, for migration processing (e.g., steps 514 and/or 516 of FIG. 7), that FA may also notify other FAs in the same group to perform similar processing.

It should also be noted that in the foregoing, a single migration process may be executing on each FA. An embodiment may also have more than one such migration process executing on an FA using the techniques described herein. With reference to FIG. 4 in such an embodiment, there may be two migration processes 114 executing on a single FA. The scheduler 110 may determine the scheduling interval for each migration process executing on the FA. Similarly, the thresholds 112 may be a common set of thresholds used for the one or more migration processes executing on the FA.

Although the techniques described herein are illustrated in connection with performing online migration, it will be appreciated by those skilled in the art that the techniques may also be used in connection with other processing.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for allocating resources comprising:
providing two consumer processes using two resources;
providing a first threshold of a first of said resources for a first of said two consumer processes;
providing a second threshold of a second of said resources for said first consumer process;
receiving consumption information regarding actual consumption of said two resources by said first consumer process;
scheduling execution of said first consumer process in accordance with said first and said second thresholds and said consumption information;
periodically performing first processing to determine whether to adjust the second threshold, said first processing comprising:
  receiving second consumption information regarding actual consumption of said second resource by a second of said two consumer processes;
  determining a first amount of said second resource currently available for use by said second consumer process, said first amount being determined based on a difference between a total amount of the second resource for allocation between the two consumer processes and said second threshold; and
  determining whether to decrease said second threshold by performing second processing, said second processing including:
    comparing said first amount to said second consumption information regarding actual consumption of the second resource by the second consumer process;
    determining whether there is at least a minimum amount of difference between the first amount identifying an amount of the second resource currently available for use by the second consumer process if the first consumer process consumes a maximum limit of the second resource as specified by the second threshold and the second consumption information identifying actual consumption of the second resource by the second consumer process, wherein said minimum amount of difference is greater than zero; and
    if it is determined that there is not at least the minimum amount of difference, decreasing said second threshold denoting a maximum limit of the second resource allowable for allocation by the first consumer process whereby scheduled execution time of the first consumer process is adjusted.

2. The method of claim 1, further comprising:
determining whether actual consumption of any of said two resources by said first consumer process exceeds or is within a predetermined amount of a corresponding one of said thresholds; and
adjusting scheduled execution time of said first consumer in accordance with said determining whether actual consumption of any of said two resources of said first consumer process exceeds or is within a predetermined amount of a corresponding one of said thresholds.

3. The method of claim 1, wherein said resources are included in a data storage system, said resources are allocated for use by said two consumer processes executing in said data storage system, said second consumer process processing I/O operations received at said data storage system from a host, and said first of said two consumer processes is a migration process that migrates data between said data storage system and another data storage system.

4. The method of claim 3, further comprising:
prior to allocating additional portions of said resources for use by said migration process, determining if said allocating causes any one of said thresholds to be exceeded, and if any one of said thresholds is exceeded, suspending execution of said migration process until said additional portions are available for use by said migration process.

5. The method of claim 3, wherein said two consumer processes utilize said two resources associated with a first adapter and are executed using a processor of said first adapter.

6. The method of claim 5, wherein said first resource is port bandwidth of a port of said first adapter and said second resource is an amount of I/O buffers of said first adapter, said port being used for communications between said data storage system and said other data storage system, and for communications between said data storage system and said host.

7. The method of claim 6, wherein said other data storage system processes data migrated by said migration process at a first rate slower than a second rate at which said data storage system transmits said data.

8. The method of claim 1, wherein said scheduling includes adjusting an amount of time between scheduled execution times of said first consumer process to maintain consumption of said two resources below said thresholds.

9. The method of claim 7, wherein an amount of said port bandwidth allocated for use by said migration process in accordance with said first threshold affects an amount of said I/O buffers consumed by said migration process.

10. The method of claim 3, wherein said migration process pushes data from said data storage system to said other data storage system.

11. The method of claim 3, wherein said migration process pulls data from said other data storage system to said data storage system.

12. A data storage system comprising:
at least one data storage device;
one or more adapters, each of said adapters including code for:
migrating data between said at least one data storage device of said data storage system and another data storage system;
receiving a first threshold and a second threshold, said first threshold indicating a maximum amount of port bandwidth of said each adapter for use in connection with said migrating, said second threshold indicating a maximum amount of I/O buffers of said each adapter for use in connection with said migrating;
scheduling said migrating in accordance with said first and said second thresholds;
processing I/O operations received from a host at said data storage system;
periodically performing first processing to determine whether to adjust the second threshold, said first processing comprising:
receiving consumption information regarding actual consumption of said I/O buffers when processing said I/O operations received;
determining a first amount of said I/O buffers currently available for use when processing said I/O operations received, said first amount being determined based on a difference between a total amount of the I/O buffers for allocation between said migrating and when processing the I/O operations, and said second threshold; and
determining whether to decrease said second threshold by performing second processing, said second processing including:
comparing said first amount to said consumption information regarding actual consumption of said I/O buffer when processing the received I/O operations;
determining whether there is at least a minimum amount of difference between the first amount identifying an amount of the I/O buffers currently available for use when processing said I/O operation received if said migrating consumes a maximum limit of the second resource as specified by the second threshold and the consumption information identifying actual consumption of said I/O buffers for processing said I/O operations received, wherein said minimum amount of difference is greater than zero; and
if it is determined that there is not at least the minimum amount of difference, decreasing said second threshold denoting a maximum limit of said I/O buffers allowable for allocation when performing said migrating whereby scheduled execution time of a process performing said migrating is adjusted.

13. The data storage system of claim 12, wherein said data storage system includes a plurality of adapters.

14. The data storage system of claim 13, wherein each of said adapters includes code for migrating data by pushing data from said data storage system to said other data storage system.

15. The data storage system of claim 13, wherein each of said adapters includes code for migrating data by pulling data from said other data storage system to said data storage system.

16. A non-transitory computer-readable medium comprising code for allocating resources, the computer-readable medium comprising code for:
providing two consumer processes using two resources;
providing a first threshold of a first of said resources for a first of said two consumer processes;
providing a second threshold of a second of said resources for said first consumer process;
receiving consumption information regarding actual consumption of said two resources by said first consumer process;
scheduling execution of said first consumer process in accordance with said first and said second thresholds and said consumption information;
periodically performing first processing to determine whether to adjust the second threshold, said first processing comprising:
receiving second consumption information regarding actual consumption of said second resource by a second of said two consumer processes;
determining a first amount of said second resource currently available for use by said second consumer process, said first amount being determined based on a difference between a total amount of the second resource for allocation between the two consumer processes and said second threshold; and
determining whether to decrease said second threshold by performing second processing, said second processing including:

comparing said first amount to said second consumption information regarding actual consumption of the second resource by the second consumer process;

determining whether there is at least a minimum amount of difference between the first amount identifying an amount of the second resource currently available for use by the second consumer process if the first consumer process consumes a maximum limit of the second resource as specified by the second threshold and the second consumption information identifying actual consumption of the second resource by the second consumer process, wherein said minimum amount of difference is greater than zero; and if it is determined that there is not at least the minimum amount of difference, decreasing said second threshold denoting a maximum limit of the second resource allowable for allocation by the first consumer process whereby scheduled execution time of the first consumer process is adjusted.

17. The non-transitory computer readable medium of claim 16, wherein said resources are included in a data storage system, said resources are allocated for use by said two consumer processes executed by a processor of a first adapter in said data storage system, a second of said two consumer processes processing I/O operations received at said data storage system from a host, said first of said two consumer processes is a migration process that migrates data between said data storage system and another data storage system, said first resource is port bandwidth of a port of said first adapter and said second resource is an amount of I/O buffers of said first adapter, said port being used for communications between said data storage system and another data storage system, and for communications between said data storage system and said host.

* * * * *